United States Patent [19]

Sensi et al.

[11] 3,854,922

[45] Dec. 17, 1974

[54] THRESHOLD MOUNTED IN A MOLTEN GLASS DELIVERY APPARATUS

[75] Inventors: John E. Sensi, Arnold; George O. Wehner, Bethel Park, both of Pa.

[73] Assignee: PPG Industries, Inc., Pittsburgh, Pa.

[22] Filed: Mar. 27, 1974

[21] Appl. No.: 455,429

[52] U.S. Cl. ............................... 65/172, 65/182 R
[51] Int. Cl. ............................................. C03o 18/02
[58] Field of Search....... 65/65 A, 99 A, 182 R, 172

[56] References Cited
UNITED STATES PATENTS

| | | | |
|---|---|---|---|
| 710,357 | 9/1902 | Heal | 65/182 R |
| 789,911 | 5/1905 | Hitchcock | 65/182 R |
| 3,331,672 | 7/1967 | Javaux | 65/99 A |
| 3,486,614 | 12/1969 | Long | 65/99 A |
| 3,508,902 | 4/1970 | Cusick | 65/182 R |

Primary Examiner—Robert L. Lindsay, Jr.
Attorney, Agent, or Firm—E. Kears Pollock

[57] ABSTRACT

An apparatus for mounting a threshold in communication with a glass forming chamber containing molten metal includes a supporting structure and tension members for drawing the threshold against both the supporting structure and the inlet end of a glass forming chamber. The apparatus may also include outboard compression members for urging side members or jambs inwardly against the threshold. The entire assembly is easily removable for repair or replacement, yet a glassmaking apparatus including it is not subject to loss of molten metal due to separation of the threshold from the forming chamber during use.

11 Claims, 5 Drawing Figures

THRESHOLD MOUNTED IN A MOLTEN GLASS DELIVERY APPARATUS

BACKGROUND OF THE INVENTION

1. Field of the Invention

The present invention relates to apparatus for manufacture of flat glass wherein the glass is formed while being supported on a surface of a pool of molten metal following delivery thereto as molten glass flowing in a substantially horizontal stream from a glassmaking furnace. More particularly, this invention relates to a combination of elements comprising suitable means for supporting molten glass for delivery onto a pool of molten metal.

2. Brief Description of the Prior Art

It is known that molten glass can be delivered onto molton metal and formed into a continuous ribbon or sheet of glass according to the teachings of Heal, U.S. Pat. No. 710,357; of Hitchcock, U.S. Pat. No. 789,911; of Pilkington, U.S. Pat. No. 3,083,501 and U.S. Pat. No. 3,220,816. In all of the prior art, molten glass is delivered over some rigid element, usually a refractory member, onto molten metal. In the practice disclosed by Pilkington, the molten glass is delivered through a long, narrow canal and over a lip from which the molten glass falls onto the molten metal and spreads outwardly on the molten metal. The forming chamber containing the molten metal extends upstream toward the source of molten glass in the apparatus disclosed by Pilkington. In the methods of Hitchcock, the molten glass is delivered over a refractory wall onto molten metal contained in a forming chamber adjacent to such a refractory wall downstream of the furnace in which the molten glass is prepared. In the method of Heal, molten glass is delivered over a refractory bridge.

According to the disclosure of Hitchcock in U.S. Pat. No. 1,564,240 the molten metal on which glass is to be formed into a continuous sheet may be contained within a forming chamber comprising a metal casing. As described in U.S. Pat. Nos. 3,584,475 and 3,594,147 to Galey and Sensi, this metal casing may be provided with a refractory liner. Refractory-lined metal casing structures are shown and described in U.S. Pat. No. 3,584,477 to Hainsfurther.

The bottom portion of a typical forming chamber which contains molten metal on which glass is to be formed includes a bottom, side members and end members and is in the form of an open-topped box. A top portion of a typical forming chamber includes a top, sides and end which are sealed to the bottom portion in order to provide an enclosed forming chamber. Because the canal and lip through which and over which molten glass flows prior to being deposited on the molten metal extends above the surface of the molten metal and inwardly from the inlet end of a forming chamber over the molten metal, it is quite easy in a mechanical sense to provide a casing for the bottom portion of a forming chamber such as described by Pilkington, Hainsfurther or Galey and Sensi. Such a casing extends above the intended level for the molten metal pool within such a forming chamber.

According to the teachings of Hitchcock, molten glass is delivered directly through a front wall in a furnace and onto molten metal in an enclosed forming chamber. The front wall of the furnace is a common wall to the enclosed forming chamber, constituting an inlet end wall thereof. Because of the necessarily high temperature of molten glass in the furnace as it is delivered to the enclosed forming chamber, this common wall is necessarily a refractory wall. Such a wall is subject to deterioration during use and it may be readily observed that any leak developing in such a common wall beneath the level of the surface of the molten metal pool within the enclosed forming chamber will result in the loss of molten metal into the bottom of the adjacent glassmaking furnace. This is so since the molten metal is fluid and is more dense than molten glass. In the apparatus of Heal, molten glass is delivered over a refractory bridge. Failure of the downstream wall of the bridge would result in a massive loss of molten metal.

The apparatus disclosed in Heal and that disclosed in Hitchcock are not provided with means for supporting a stream of molten glass for delivery onto molten tin which can be maintained or replaced when worn without requiring a tear-down and replacement of the entire front wall of a glassmaking furnace. As disclosed in the copending application of Charles K. Edge and Gerald E Kunkle, entitled "Flat Glass Manufacturing Apparatus and Method" filed on even date herewith and incorporated by reference herein, it is desirable to provide a means for delivering molten glass from a glassmaking furnace to a glass forming chamber that is sufficiently independent of either the glassmaking furnace or the glass forming chamber so that it may be individually maintained. Thus, it is desirable to provide a molten glass delivery means that includes a bottom portion that effectively extends the bottom portion of the glassmaking furnace and is connected to the bottom of a glass forming chamber. Such a delivery means also includes side members and a roof which is connected to both the glassmaking furnace and the glass forming chamber. The delivery means further includes means for metering the flow of molten glass through it in order to control the rate of glass production.

In the copending application of Edge and Kunkle, which is incorporated by reference herein, there is a description of a suitable apparatus for delivering molten glass from a glassmaking furnace to a glass forming chamber. Such an apparatus comprises a bottom threshold member, side members or jambs extending upwardly from the threshold member and a metering member extending downwardly toward the threshold member. These elements, in combination, define an opening through which molten glass may flow. The threshold member preferably rests on an extended section of the front wall of a glassmaking furnace and against the inlet end of a glass forming chamber. As will be seen from the description which follows, the present invention provides a threshold member having particularly desirable characteristics.

SUMMARY OF THE INVENTION

A glass forming chamber is provided with an impervious support structure extending from its inlet beneath its bottom portion; a threshold member rests on this support structure and extends transversely across the inlet end of the glass forming chamber at a suitable elevation for supporting molten glass during delivery onto molten metal in the forming chamber; means are provided for urging this threshold down against the support member and also against the inlet end of the forming chamber in order to provide a sealed vessel for containing the molten metal within the forming chamber in intimate relation with the threshold member.

The present threshold assembly in combination with a glass forming chamber provides a sealed vessel for containing molten metal on which flat glass can be formed. The threshold assembly is easily removable from the glass forming chamber permitting repair or replacement of elements without extended loss of glass production.

The threshold assembly includes, in addition to a forming chamber, a delivery means connected to the forming chamber. The delivery means comprises a bottom, sides and a top defining a channel through which a stream of molten glass may be delivered onto a pool of molten metal in the forming chamber. The bottom of the delivery means comprises as its principal element, a threshold. The threshold serves as a support for molten glass as it is delivered from a glass melting and refining furnace (or other source of molten glass) to the forming chamber. The threshold also serves to separate a pool of molten glass in the furnace from a pool of molten metal in the forming chamber. In this invention the threshold also serves as a dam or barrier portion of the forming chamber to contain the molten metal within it.

An impervious structure or ledge is connected to an impervious casing surrounding the bottom portion of the forming chamber. A threshold member, usually a refractory block, is placed on this ledge and rests against the upstream or inlet end of the forming chamber bottom. The threshold block extends above the forming chamber bottom sufficiently to act as an end dam for holding molten metal in the bottom portion of the forming chamber. The threshold extends transversely across an opening in the width of the inlet end of the forming chamber. The threshold preferably has a convex, upper surface including a chamfered downstream face at an elevation such that it is partially covered by molten metal during use.

The threshold is connected to the forming chamber in a manner to prevent its movement relative to the forming chamber. It is also connected to the glassmelting and refining furnace or other source of molten glass for delivery to the forming chamber. This connection is preferably not fixed but rather is one permitting movement between the threshold and the furnace. This permits expansion of the furnace during heatup prior to use. The threshold preferably rests on a basin wall portion of the front wall of the furnace so that it can slide over that wall as it moves during expansion. Following heatup, it is desirable to mud the expansion joint although little danger of molten glass leakage exists since any molten glass emerging from the joint will solidify.

The connection between the threshold and the forming chamber is maintained by one or more elements which urge the threshold against the inlet end of the forming chamber. In a preferred embodiment a pair of tension arms are connected to the threshold and to structural members beneath the forming chamber. The tension arms are connected to the threshold through one or more rigid members extending through the refractory blocks of the threshold. These rigid members may be and preferably are water-cooled pipes. The tension arms may be turnbuckles, cables or the like. Preferably, the tension arms are spring-loaded tension connectors of a conventional type.

In a preferred embodiment of this invention side members or jambs extending upwardly from the ends of the threshold are shaped to overlay portions of the threshold top surface and to extend to the bottom of the threshold adjacent its ends. In this embodiment two or more rigid members extending through the threshold and both of the jambs are preferred. Means are provided to insure that one rigid member engages the jambs and one engages the threshold so that not only the threshold but also the jambs are urged against the inlet end of the forming chamber by the tension arms. This may be accomplished by providing the threshold with larger or smaller openings for receiving the rigid members than the openings in the jambs for receiving them and by using differently sized rigid members or a shim or collar to accommodate the element with the larger openings to its engaging rigid member.

The apparatus according to this invention may further include means for urging the jambs against the threshold. Such means are conveniently provided by providing a transverse tension member extending along the transverse length of the threshold and beyond the ends of the threshold and the jambs outboard of the threshold and by connecting to each end of this transverse tension member a compression assembly to buck outwardly against the transverse tension member and inwardly against a jamb. The transverse tension member may be a structural member beneath the forming chamber or may be the impervious structure or ledge upon which the threshold rests.

In a preferred embodiment of this invention the bottom of the forming chamber adjacent the threshold is a refractory material that is cast in place following the mounting of the threshold on the end of the forming chamber. Such a cast refractory provides a seal which prevents the molten metal in the forming chamber from leaking from it between the threshold block and the casing of the forming chamber. The cast-in-place refractory may extend partially beneath the threshold and may have its upper surface sloped upwardly to meet the upper downstream face of the threshold so that only a small amount of the molten metal is above the joint between the threshold and the cast refractory.

The invention may be further appreciated from the drawings accompanying this description.

DESCRIPTION OF THE PREFERRED EMBODIMENTS

Figure 1:
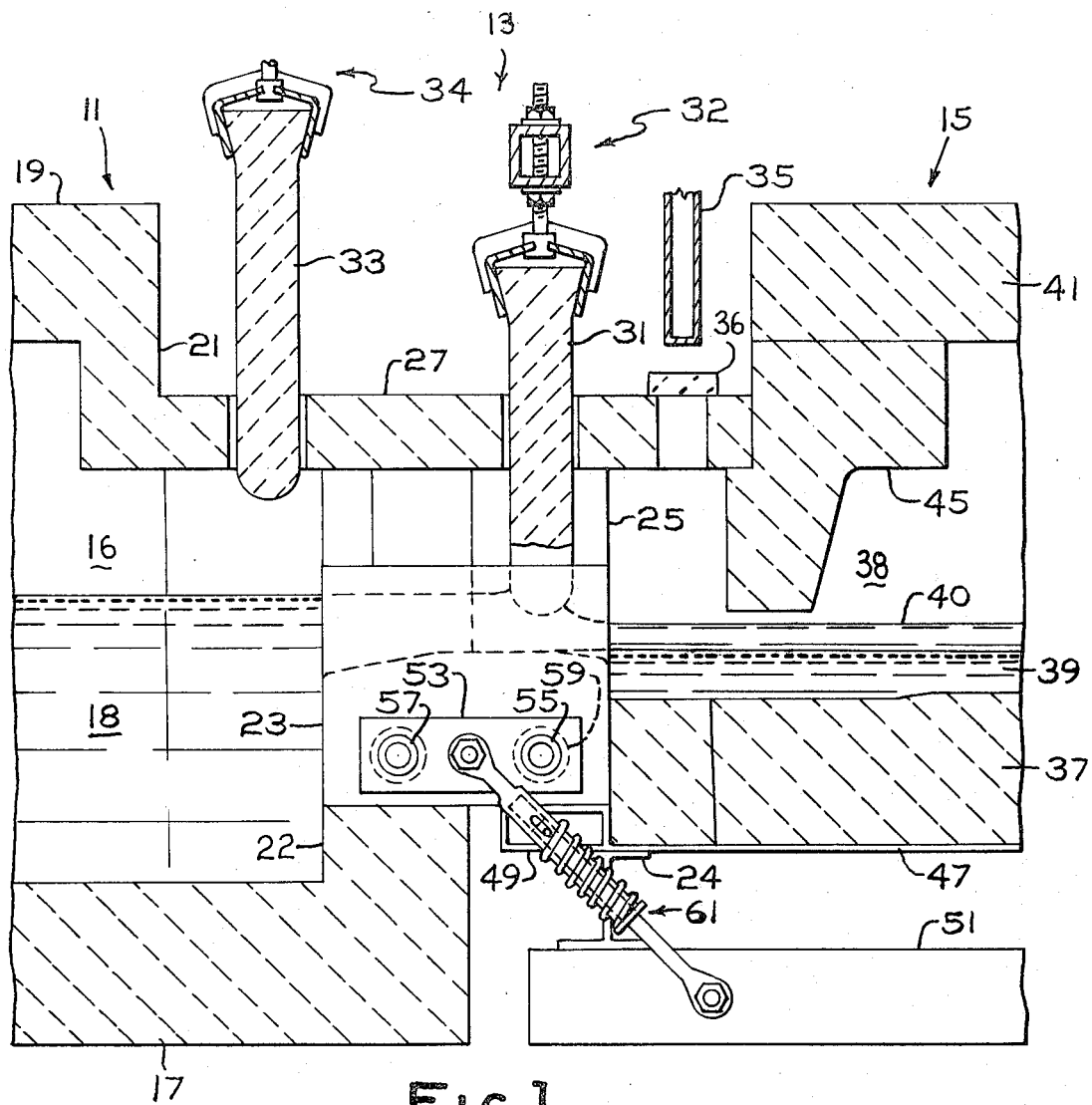
FIG. 1 is a partial sectional view of a longitudinal elevation of a delivery means, furnace and forming chamber according to this invention.

Referring now to FIG. 1, there is shown the refiner of a glass-making furnace 11 and connected to it means 13 for delivering molten glass from the refiner 11 to a forming chamber 15 which in turn is connected to the molten glass delivery means 13.

The refiner comprises walls 16 and a bottom 17 which provide a container for a pool of molten glass 18. The refiner further comprises a roof 19 and a front wall 21 which includes an extended basin wall 22. The refiner bottom, walls and roof are generally constructed of refractory materials in a conventional manner.

Figure 4:
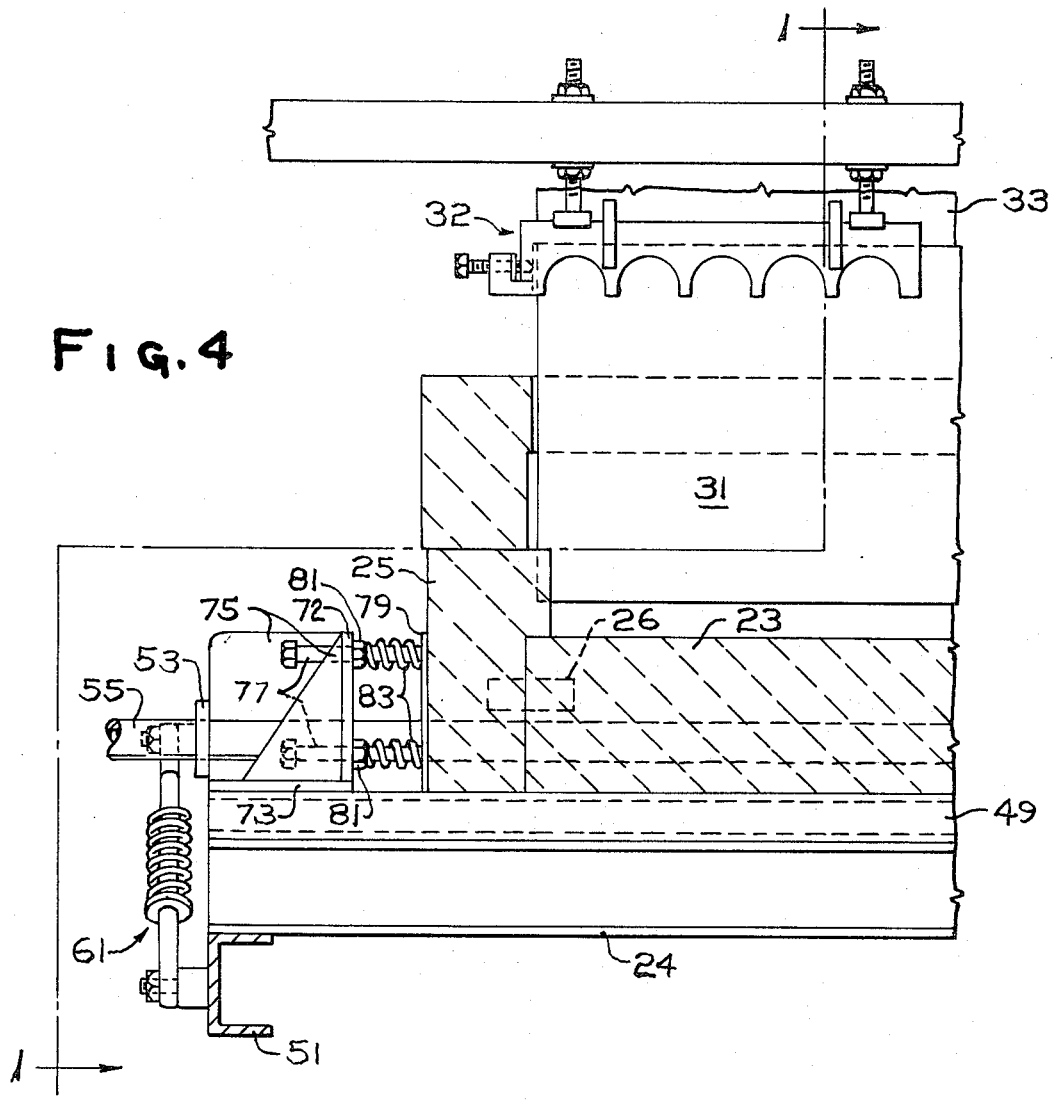
FIG. 4 is a partial sectional view of a transverse elevation of a delivery means threshold region according to this invention showing a preferred embodiment that includes means for urging jambs against a threshold.

The delivery means 13 includes a threshold 23 supported by a support structure 24 and by the extended basin wall 22. The delivery means also includes side members or jambs 25 extending upwardly from the ends of the threshold 23. These may be joined or connected to the threshold 23 by pins 26 as seen in FIG. 4. The delivery means further includes a roof 27, preferably a flat arch, extending from the furnace front wall 21 to the forming chamber 15 and across from one side member 25 to the other. The delivery means also includes a metering member or control tweel 31 for engaging molten glass and controlling the size of the opening through which molten glass may flow. This control tweel 31 is supported by an apparatus 32 for raising and lowering it which can include means for manually or automatically controlling its elevation (not fully shown but may be that shown in U.S. Pat. No. 3,764,285 to Matesa and Farabaugh). A back-up metering member or tweel 33 is also provided. It is mounted on means 34 for raising or lowering it.

In the downstream portion of the roof 27 is an opening through which a shear cake 35 may be lowered to close off the forming chamber 15 during maintenance or replacement of a threshold 23. When the apparatus is in use making glass, a cover plate 36 is placed over the opening and sealed to the roof 27 with a castable refractory.

The forming chamber 15 includes a bottom 37 resting on a supporting structure such as support 24 and walls 38. These, along with an end dam or lip (not shown) at the downstream or outlet end of the chamber and the threshold 23, form a container for holding a pool of molten metal 39 upon which a body of glass 40 may be supported for forming into flat glass.

The forming chamber also includes a roof 41. This, along with the sides 38, a lintel 45 and exit or outlet end seals (not shown), forms a headspace over the pool of molten metal 39. This headspace is provided with a protective atmosphere, usually inert or reducing, during use.

The forming chamber includes a casing 47 that is generally an impervious shell made of metal, preferably steel. The casing may comprise a top portion and a bottom portion that are separated by a space above the elevation of the molten metal with the space sealed by easily removable elements to provide easy access to the inside of the forming chamber. The bottom portion of the casing is then an open-top metal box resting on supports and containing a refractory lining comprising the bottom 37 and a portion of the walls 38. The casing is provided with a transverse opening for receiving the threshold 23.

Figure 2:
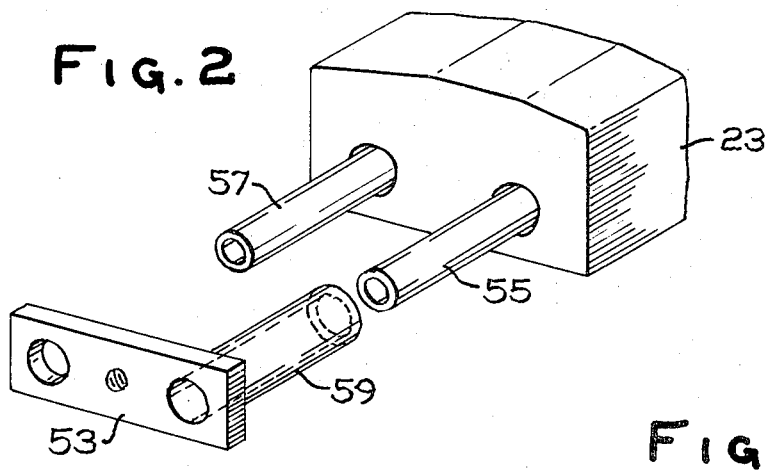
FIG. 2 is a partial exploded perspective view of a threshold and rigid members according to this invention.

Extending from the upstream or inlet end of the forming chamber and connected to the casing 47 is a structure 49 upon which the threshold 23 can rest. In a preferred embodiment the structure 49 is hollow and may be cooled by directing coolant, such as water, through it. A structural member 51 is suitably positioned beneath the elevation of the forming chamber 15 to act as a restraint or dead man for a tension arm 61 to be described below. The structural member 51 may simply be a channel connected to a support for the forming chamber or may be any conveniently located fixed element. A bearing plate 53 is provided for engaging the threshold 23 through a pair of rigid, transverse members 55, 57. One of the transverse members is provided with a collar 59 in a preferred embodiment wherein one transverse member 59 is employed to apply a force to the threshold 23 and another transverse member is employed to apply a force to the jambs 25, FIG. 2.

Figure 3:
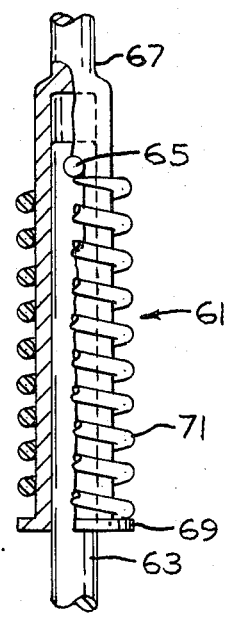
FIG. 3 is a detailed view of a suitable tension arm for use in this invention.

A tension arm 61 connects the bearing plate 53 to the structural member 51. A similar arm is provided at the opposite end of the threshold 23. The tension arm, as shown in FIG. 3, comprises a rod 63 having a pin 65 near one end, a sleeve 67 having a flange 69 at one end and having a pair of slots for receiving the pin 65 and a compression spring 71. The rod 63 is axially located within the sleeve 67 with its pin 65 extending through the slots in the sleeve 67. The spring 71 is located between the pin 65 and the flange 69. The sleeve is connected to either the bearing plate 53, as shown, or to the structural member 51 and the rod is connected to the other element 51 or 53 as the case may be. The tension arm is extended sufficiently to place the arm in tension as it works against the spring 71.

Figure 5:
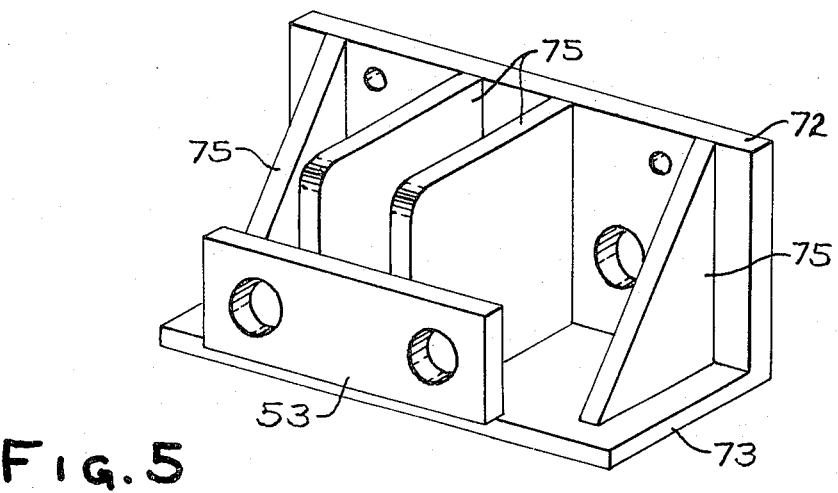
FIG. 5 is a detailed view of a suitable buck plate assembly for connection to the transverse tension member in FIG. 4

In a preferred embodiment of this invention the jambs 25 are urged against the threshold 23. Referring now to FIGS. 4 and 5, there is shown means for urging these elements together.

The support structure 24 and the ledge or impervious member 49 act also as transverse tension members in this embodiment of the invention. Connected to each end of the ledge 49 is a backup place 72 and a base plate 73, which together with brace plates 75, act as a bucking assembly. Compression members extend between the backup plate 72 and the jamb 25 in order to urge it against the threshold 23. In the embodiment shown each compression member is a bolt 77 extending through a hole in the backup plate 72 and resting against a bearing relief plate 79 to distribute its force against the outer face of the jamb. A backup nut 81 may be threaded on the bolt 77 to drive it against both the backup plate 72 and the bearing relief plate 79 or a compression spring 83 may be located between the plates 77 and 79 with the bolt 77 merely serving as a guide for the spring.

In a preferred embodiment the refractory bottom 37 of the forming chamber region adjacent the threshold 23 is a refractory material that is cast in place in the manner of U.S. Pat. No. 3,594,147.

At the time a threshold 23 is mounted in position a space is left in the bottom of the forming chamber between the threshold 23, the side walls 38, the refractory bottom 37 and the bottom casing 47. A refractory paper (to accommodate expansion and contraction) is preferably adhered to the downstream face of the threshold 23 and the upper surface of the casing 47. Then a slip of refractory is placed in the space, formed, dried and cured to form an inlet end of the refractory bottom 37. Retaining pins may be connected to the casing, and the refractory may be cast about them and anchored by them in the manner described in U.S. Pat. No. 3,594,147.

In a preferred emodiment of this invention an alumina-silica fiber paper (FIBERFRAX paper sold by Carborundum Co., Niagara Falls, N.Y.) is bonded to the downstream face of a threshold after it is mounted on the inlet end of a forming chamber. A flowable slip is prepared of refractory material (KAOCAST refractory sold by Babcock and Wilcox Co., New York, N.Y.) and water. This slip is poured into the space or cavity defined by the threshold, the casing and the bottom of the forming chamber. The slip is mechanically vibrated to eliminate bubbles which could cause voids in the refractory after curing. The material is maintained at temperatures below 200°F. for about 1 day to dry it (remove free water). It is then heated to operating temperatures over a period of about 1 to 2 days to cure it. The entire assembly is then suitable for containing molten metal.

Referring again to FIG. 1, the ease with which a threshold in the present apparatus may be replaced or repaired will be appreciated. The tweel 33 is lifted completely out from the apparatus and replaced by a water-cooled shear cake of sufficient length to reach the bottom 17 of the furnace 11. This shear cake is lowered into place stopping the flow of molten glass over the threshold 23. The cover plate 36 is removed, and the shear cake 35 is dropped into place against the bath bottom 39. Alternatively, a heat-resistant curtain, such as for example, a fiber glass curtain, may be used to close the forming chamber entrance. Power and fuel to the forming chamber and the furnace are reduced to a maintenance level.

Next, the tweel 31 and its lifting mechanism 32 are removed. Following this, the roof 27 and the external side refractory materials, instruments and equipment in the vicinity of the side members 25 are removed.

The tension arms 61 are adjusted during cooling (which occurs naturally after the cessation of glass flow) to gradually relax the tension imposed by them. This is accomplished in a balance fashion to prevent warping of the threshold and jambs. After the tension in the tension arms is relieved, they are disconnected and the coolant lines connected to the pipes 55, 57 are disconnected. Then the compression bolts 77 are released and removed. The jambs are then lifted from the apparatus followed by the removal of the threshold. A new threshold may be installed by reversing the described removal procedure.

While this invention has been described with reference to particularly preferred embodiments, those skilled in the art will recognize variation that may be made without departing from the spirit or scope of this invention. Accordingly, this disclosure is intended to be illustrative rather than limiting.

We claim:

1. In a glass forming apparatus comprising a chamber having an inlet end and an outlet end and including a bottom for containing a pool of molten metal, a top roof portion for enclosing a space extending above the pool of molten metal, a lift-off assembly in the outlet end of the glass forming chamber for removing a continuous sheet of glass from the chamber, means for sealing the enclosed chamber from the outside environment and means at the inlet end of the glass forming chamber for connecting the glass forming chamber to a glassmaking furnace for delivering molten glass therefrom to the glass forming chamber, the improvement comprising:
   a. an impervious structure connected to an impervious casing extending from the inlet end of the glass forming chamber beneath the bottom portion of the glass forming chamber;
   b. a threshold member resting on the impervious structure and disposed transversely across the inlet end of the glass forming chamber, wherein the threshold member extends above the level for molten metal; and
   c. means for urging the threshold member against the bottom portion of the glass forming chamber.

2. The apparatus according to claim 1 wherein the means for urging the threshold member against the glass forming chamber comprises a rigid member extending transversely through the threshold member and, connected to the rigid member on each end of the threshold member, a force-applying arm fixedly mounted on a structural member.

3. The apparatus according to claim 2 wherein the force-applying arms are tension arms, each mounted on a structural member integral to structural support means of the glass forming chamber.

4. The apparatus according to claim 1 wherein the improvement further comprises side members, one at each end of the threshold member, and means for urging the side members against the bottom portion of the glass forming chamber.

5. The apparatus according to claim 4 wherein the means for urging the side members against the bottom portion of the glass forming chamber comprises a rigid member extending through the side members and transversely through the threshold member and, connected to the rigid member at each end beyond the end of the threshold member, a force-applying arm fixedly mounted on a structural member.

6. The apparatus according to claim 5 wherein two rigid members extend through the threshold member and through the side members, one engaging the threshold member and one engaging the side members, and wherein the force-applying arms are connected to both rigid members for urging the combination against the bottom portion of the glass forming chamber.

7. The apparatus according to claim 4 wherein each side member is shaped to engage an end and a portion of the top of the threshold member and wherein the apparatus further comprises means for urging the side members against the ends of the threshold member.

8. The apparatus according to claim 7 wherein the means for urging the side members against the ends of the threshold member comprises a tension member extending in substantial alignment with and beyond the ends of the threshold member and compression means connected to the tension member and engaged against a side member such that the side member is between the compression means and the end of the threshold block.

9. The apparatus according to claim 8 wherein the tension member comprises the threshold member support structure and a pair of vertically extending plates connected thereto, one at each end of the threshold member, and wherein the compression means comprises a compression spring positioned between one of the vertically extending plates of the tension member and the side member adjacent thereto.

10. The apparatus according to claim 9 wherein two rigid members extend through the threshold member, through the side members and beyond the vertically extending plates of the tension member, one rigid member engaging the threshold member and one rigid member engaging the side members, and wherein a force-applying arm is connected to each of the two rigid members and to a structural member.

11. The apparatus according to claim 1 wherein the bottom of the glass forming chamber adjacent the threshold is a cast-in-place refractory material.

* * * * *